March 17, 1936.                G. W. FERNSTRÖM                 2,034,566
                               ROLLER BEARING CAGE
                               Filed Oct. 18, 1935

INVENTOR
Gustav Wallentin Fernström
BY Chas. Lyon Russell
his        ATTORNEY

Patented Mar. 17, 1936

2,034,566

UNITED STATES PATENT OFFICE 2,034,566

ROLLER BEARING CAGE

Gustav Wallentin Fernström, Goteborg, Sweden, assignor to Aktiebolaget Svenska Kullagerfabriken, Goteborg, Sweden, a corporation of Sweden Application October 18, 1935, Serial No. 45,594
In Sweden January 26, 1935

5 Claims. (Cl. 308—218)

This invention relates to cages for double-row roller bearings.

In roller bearings roller cages with drilled pockets for the rollers as well as roller cages stamped from sheet blanks and bent to suitable form are used. When manufacturing roller bearings in series the costs for sheet steel cages are much less than for drilled cages, and therefore, as far as circumstances permit, it is desirable to obtain a suitable sheet steel roller cage for each type of bearing.

The object of the present invention is to provide a suitable pressed steel roller cage for double row roller bearings of a type in which there is a space between the end faces of the rollers in the two rows of rollers. The object of the invention is primarily to obtain a roller cage, the design of which is such that the roller cage is guided by the end faces of the rollers. The cage according to the invention consists of an annular central part and a number of tongues on the same which are alternately bent in opposite directions and together with the central part form two series of roller pockets staggered in relation to each other, the arrangement being characterized substantially thereby that the central part at least at one circumference is provided at each roller pocket with an outward bulge in the direction of the end face of the respective roller.

Figure 1:
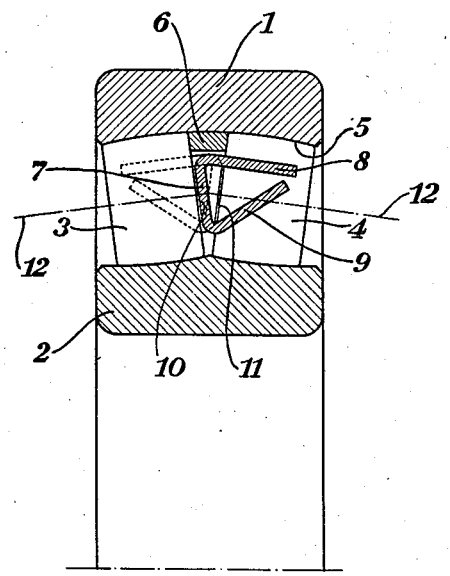
Figure 2:
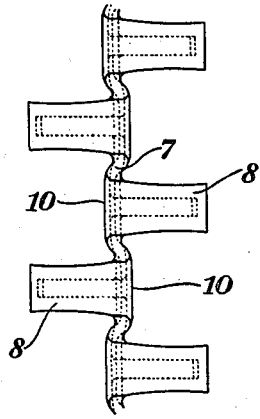

One embodiment of the invention is illustrated in the accompanying drawing in which, Figure 1 is a sectional view through a self aligning roller bearing, provided with a roller cage according to the invention, and Figure 2 is an end view of the roller cage.

In Figure 1 the numeral 1 denotes the outer and 2 the inner bearing ring between which are two series of barrel-shaped rollers, 3 and 4. The outer bearing ring 1 has a spherical roller race 5 against which a guide ring 6 bears which guide ring is located between the two roller races. The rollers are separated by a roller cage, comprising a central part 7 of annular form, and a number of laps or tongues 8 and 9. The tongues 8 extend alternately at the respective sides of the cage from the outer circumference of the central part. The tongues 9 extend in a like manner from the inner circumference of the central part and are located radially inside the tongues 8.

Owing to the inclination of the roller axes relative to each other there is an annular space of triangular section between the two rows of rollers. In order to guide the cage in axial direction, the central part at each roller pocket is provided with an outward bulge in the direction towards the end of the respective roller so that the member 10 of the central part which forms the bottom surface of the roller pocket abuts against or very nearly bears against the end surface 11 of the respective roller. In roller bearings having rollers obliquely positioned relative to the bearing axis the inclination of the annular central part, as shown in Figure 1, will change direction at each bulge. The inclination is suitably directed in such a manner that the bottoms 10 of the roller pockets are at substantially right angles to the axis 12 of the appertaining roller.

In the embodiment shown the distance between the rows of rollers is so small that the bulges at the inner circumference of the central part although present are very slight indeed. In certain bearings, however, the distance between the rows of rollers is so great that bulges occur also at the inner circumference of the central part. This will naturally also be the case in bearings in which the roller axes of the two series of rollers are parallel.

Having thus described my invention, I claim and desire to secure by Letters Patent:

1. A roller cage of sheet metal for double-row roller bearings in which there is a space between the inner roller end surfaces of the two rows of rollers, comprising an annular central part and a number of tongues at the respective sides thereof so formed that the tongues together with the central part provide two series of roller pockets, the pockets of the respective series being staggered circumferentially in relation to each other, and the central part at least at the one circumference being formed at each roller pocket with a bulge directed sidewise toward the end of the respective roller position.

2. A roller cage of sheet metal for double-row roller bearings in which there is a space between the inner roller end surfaces of the two rows of rollers, comprising an annular central part and a number of tongues at the respective sides thereof so formed that the tongues together with the central part provide two series of roller pockets, the pockets of the respective series being staggered circumferentially in relation to each other, and the central part at least at the one circumference having a wave formation, the crests of the waves being directed toward the ends of the respective roller positions, and the axial distance between the wave crests of the respective sides corresponding substantially to the distance between opposing roller end surfaces.

3. A roller cage according to claim 1 for roller bearings with rollers obliquely positioned relative to the bearing axle, characterized thereby that the inclination of the annular central part against the bearing axis changes at each bulge so that the bottoms of the roller pockets are substantially at right angle to the axis of the appertaining roller.

4. A roller cage according to claim 2 for roller bearings with rollers obliquely positioned relative to the bearing axle, characterized thereby that the inclination of the annular central part against the bearing axis changes at each wave crest so that the bottoms of the roller pockets are substantially at right angle to the axis of the appertaining roller.

5. A roller cage of sheet metal for double row roller bearings, in which there is a space between the inner roller end surfaces of the two rows of rollers comprising an annular central part and a number of tongues extending sideways from the said central part so as to form roller pockets at the two sides of the central part in staggered relation, there being offsets from the sides of the central part between tongues on the respective sides and extending in the same general direction.

GUSTAV WALLENTIN FERNSTRÖM.